(12) United States Patent
Baker

(10) Patent No.: US 11,298,639 B2
(45) Date of Patent: Apr. 12, 2022

(54) ELECTROLYSIS FILTERING SYSTEM FOR DIELECTRIC FLUIDS

(71) Applicant: Waylon Dale Baker, Plant City, FL (US)

(72) Inventor: Waylon Dale Baker, Plant City, FL (US)

( * ) Notice: Subject to any disclaimer, the term of this patent is extended or adjusted under 35 U.S.C. 154(b) by 23 days.

(21) Appl. No.: 16/911,057

(22) Filed: Jun. 24, 2020

(65) Prior Publication Data

US 2021/0402336 A1  Dec. 30, 2021

(51) Int. Cl.
| | |
|---|---|
| *B01D 35/06* | (2006.01) |
| *B01D 35/26* | (2006.01) |
| *B01D 17/06* | (2006.01) |
| *C25B 9/17* | (2021.01) |

(52) U.S. Cl.
CPC ............ *B01D 35/06* (2013.01); *B01D 17/06* (2013.01); *B01D 35/26* (2013.01); *C25B 9/17* (2021.01)

(58) Field of Classification Search
CPC ............ B01D 17/06; B01D 35/06; C25B 9/17
See application file for complete search history.

(56) References Cited

U.S. PATENT DOCUMENTS

| | | | | |
|---|---|---|---|---|
| 4,372,837 A | * | 2/1983 | Watson | ................. B03C 5/024 204/562 |
| 5,062,940 A | * | 11/1991 | Davies | ............... B01D 21/0009 204/228.3 |
| 2021/0339174 A1 | * | 11/2021 | Tuz | .......................... B03C 11/00 |

* cited by examiner

*Primary Examiner* — Brian W Cohen

(57) ABSTRACT

An electrolysis filtration system to filter dielectric fluids is described.

17 Claims, 15 Drawing Sheets

ELECTROLYSIS FILTERING SYSTEM FOR DIELECTRIC FLUIDS

TECHNICAL FIELD

Some implementations relate generally to electrolysis filtering system for dielectric fluids and more particularly to an inline apparatus which removes water at the micron level from dielectric fluids.

BACKGROUND

Several different types of methods have been used for the removal of fine particulate from dielectric fluids and in many cases with the uses of electrostatic filtration devices. In these electrostatic filters the fluid to be purified is pumped through an apparatus with charged electrodes. In some cases high voltage is used on the electrodes and this can result in arcing if the electrodes are positioned too close to each other. Also the spacing of the electrodes varies. In some cases the space between the electrodes is a few inches and in other cases they are as close as an inch and this can cause a bottle neck slowing down the fluid making the pressure rise as it flows between the electrodes in the filter. As the fluid passes through the filter the small particles in the fluid are charged causing them to stick to a filter medium that is usually inside the filter housing in between and around the electrodes. Some of the filters in the prior art charge the fluid with a plurality of electrodes, which must be wired together either in series or in parallel. The wiring of the prior art filters has presented difficulties in fabrication in that a buss bar, wire or other separate electrical attaching system is required to link together the plurality of electrodes. In some cases the electrodes can flex from the pressure and cause a short. While many of the electrostatic filters of the prior art have been effective in the removal of fine particles they do not claim to remove water from the fluid.

Water can exist in oil in three states or phases. The first state, known as dissolved water, is characterized by individual water molecules dispersed throughout the oil. Dissolved water in a lubricating oil is comparable to moisture in the air on a humid day—the water may be there, but because it is dispersed molecule-by-molecule, it is too small to see.

For this reason, oil can contain a significant concentration of dissolved water with no visible indication of its presence. Most industrial oils such as hydraulic fluids, turbine oils, etc., can hold as much as 200 to 600 ppm of water (0.02 to 0.06 percent) in the dissolved state, with aged oils capable of holding three to four times more water in the dissolved state than new oil.

Once the amount of water has exceeded the maximum level for it to remain dissolved, the oil is saturated. At this point, the water is suspended in the oil in microscopic droplets known as an emulsion (the second state). In this case, the amount of moisture in the air exceeds the saturation point, resulting in a suspension of small droplets of moisture in a lubricating oil. This is often referred to as haze with the oil said to be cloudy or hazy.

The addition of more water to an emulsified oil/water mixture will lead to a separation of the two phases producing a layer of free water (the third state) as well as free and/or emulsified oil. This free water layer is usually found on the bottom of tanks and sumps.

Water in any of the three states mention above is not good for the bearings and/or other internal components of the equipment the oil is meant to lubricate.

Therefore, it would be useful to provide an improved filter which could be used without creating high pressure, and which could be fabricated without the need for internal wiring and could remove water.

Embodiments were conceived in light of the above-mentioned problems and limitations, among other things.

SUMMARY

Some implementations can include an electrolysis filtering system for dielectric fluids that can be made from any suitable material.

Some implementations can include an electrolysis filtration system to filter dielectric fluids. The system can include an electrolysis filter having a front cover and a back cover, a first electrode plate with a first side and a second side, and a plurality of small apertures, and a second electrode plate with a first side and a second side, and a plurality of small apertures. In some implementations, the front cover can include a first terminal, a first large recessed channel, and a second large recessed channel.

In some implementations, the back cover can include a first large aperture, a second large aperture, a small aperture, a third large recessed channel, a forth large recessed channel, and a second terminal. In some implementations, the front cover and the back cover can each have an inside and an outside.

In some implementations, the inside of each of the front and back covers can have a first plane, a second plane, a third plane, and a fourth plane. In some implementations, the insides of both covers meet at the first plane. In some implementations, the second plane of the front cover is defined by a front cover electrode plate recess in which the first side of the first electrode plate rests.

In some implementations, the second plane of the back cover is defined by a back cover electrode plate recess in which the first side of the second electrode plate rests. In some implementations, the third plane of the front cover is defined by distal ends of a first set of standoffs that protrude through the plurality of small apertures in the first electrode plate and make contact with the second side of the second electrode plate when the electrolysis filter is assembled.

In some implementations, the third plane of the back cover is defined by distal ends of a second set of standoffs that protrude through the plurality of small apertures in the second electrode plate and make contact with the second side of the first electrode plate when the electrolysis filter is assembled. In some implementations, the first electrode plate and the second electrode plate each have an electrode plate width, and the first electrode plate and the second electrode plate each have an electrode plate field parallel length.

In some implementations, the first set of standoffs and the second set of standoffs define an electrode plate field spacing. In some implementations, the fourth plane of the front cover is defined by the first large recessed channel and the second large recessed channel. In some implementations, the fourth plane of the back cover is defined by the third large recessed channel and the fourth large recessed channel.

In some implementations, the first large recessed channel and the third large recessed channel define a first void between the front cover and the back cover, and the second large recessed channel and the fourth large recessed channel define a second void between the front cover and the back cover, and wherein the first void and the second void are outside of an area of the electrode plate recesses of the front cover and the back cover. In some implementations, the first and second large apertures provide a passage from the first and second voids respectively to the outside of the back cover.

In some implementations, the small aperture provides a passage from the second void to the outside of the back cover. In some implementations, the first terminal is attached to the first electrode plate, and the second terminal is attached to the second electrode plate.

The system can also include a control panel having a power input source, a power switch, and a power output, a pump having a power input, a fluid input coupled to the second large aperture, a fluid output coupled to a fluid return line, and a high voltage power supply having a power input, a first and a second electrode, wherein the first electrode is connected to the first electrode plate, and wherein the second electrode is connected to the second electrode plate.

In some implementations, the first and second covers have a first small recessed channel and a second small recessed channel, where the first small recessed channel and the second small recessed channel are disposed near an outer edge of the inside of the front and back covers and are aligned when the electrolysis filter is assembled, where the first small recessed channel and the second small recessed channel provides support for sealing the front and back cover.

In some implementations, the first and second covers have a plurality of holes disposed outside of an area of the first and second small recessed channels and are near an outer edge and of the of the front and back covers, wherein a plurality of fasteners are placed through the plurality of holes to connect the front and back covers together. In some implementations, the first and second covers are held together with an adhesive.

In some implementations, the first large aperture is coupled to a fluid input source, and wherein the second large aperture is coupled to a pump. In some implementations, the first large aperture is coupled to a pump, and wherein the second large aperture is coupled to a fluid input source.

In some implementations, the relationship of the electrode plate field spacing to the electrode plate field parallel length is based on a diameter of the first large aperture. In some implementations, a DC voltage of the high voltage power supply is based on the electrode plate field spacing, and wherein current of the high voltage power supply is determined by the amount of dissolved water in the dielectric fluid. In some implementations, the electrode plate width is based on the electrolysis filter dimension, and wherein the electrode plate width is independent of the electrode plate parallel length.

In some implementations, the electrolysis filtering system further comprises a plurality of electrolysis filters connected in series. In some implementations, the electrolysis filtering system further comprises a filter medium disposed in one or more of the first and second voids. In some implementations, the electrolysis filter further comprises a plurality of electrode plate field spacings, wherein a total area of the plurality of electrode plate field spacings multiplied by the parallel length is about equal to an area of the first large aperture.

In some implementations, the front and back covers are formed of a non-conductive material. In some implementations, the first electrode plate and the second electrode plate are formed of a non-corrosive, electrically conductive material.

Some implementations can include an electrolysis filter for dielectric fluids, the electrolysis filter comprising a housing that contains a first large aperture as a fluid input, a second large aperture as a fluid output, and a small aperture as a relief vent. The electrolysis filter can also include a first electrode plate, and a second electrode plate, where the first electrode plate and the second electrode plate each have an electrode plate field parallel length, and wherein a distance between the first electrode plate and the second electrode plate, when installed in the housing, define an electrode plate field spacing. The electrolysis filter a first terminal, a second terminal, and a high voltage power supply, wherein the first terminal and the second terminal connect to a high voltage power supply. In some implementations, a voltage output level of the high voltage power supply is based on the electrode plate field spacing. In some implementations, the electrode plate field parallel length multiplied by the electrode plate field spacing is about equal to an area of the first large aperture or the second large aperture.

In some implementations, the electrolysis filter further comprises a plurality of electrode plate field spacings, where a total area of the plurality of electrode plate field spacings multiplied by the parallel length is about equal to an area of the first large aperture. In some implementations, the housing is formed of a non-conductive material.

In some implementations, the first electrode plate and the second electrode plate are formed of an electrically conductive, non-corrosive material.

Some implementations can include an electrolysis filter for dielectric fluids, the electrolysis filter comprising a housing that contains a first large aperture as a fluid input, a second large aperture as a fluid output, and a small aperture as a relief vent. The electrolysis filter can also include a first electrode plate, and a second electrode plate, where the first electrode plate and the second electrode plate each have an electrode plate field parallel length, and where a distance between the first electrode plate and the second electrode plate, when installed in the housing, define an electrode plate field spacing. In some implementations, the electrode plate field spacing multiplied by the parallel length is about equal to an area of the first large aperture or the second large aperture.

In some implementations, the electrolysis filter further comprises a first terminal coupled to the first electrode plate, and a second terminal coupled to the second electrode plate.

DETAILED DESCRIPTION

Some implementations can include an electrolysis filtering system for dielectric fluids. Electrolysis is a technique that uses a direct electric current (DC) to drive an otherwise non-spontaneous chemical reaction. The voltage that is needed for electrolysis to occur is called the decomposition potential. Electrolysis of water is the decomposition of water into oxygen and hydrogen gas due to the passage of an electric current. It ideally requires a potential difference of 1.23 volts to split water. However when water is mixed with oil and is in a dissolved state the voltage needed is much greater than of the voltage used in just pure water. Also the spacing of the electrodes need to be position closer to one another than if they were placed in just pure water. This is due to the dielectric fluids is not conductive by itself and the dissolved water is microscopic. So without the proper voltage and proper spacing you would only have an electrostatic field there would be no reaction, just the field with no electrolysis taking place.

Figure 1:
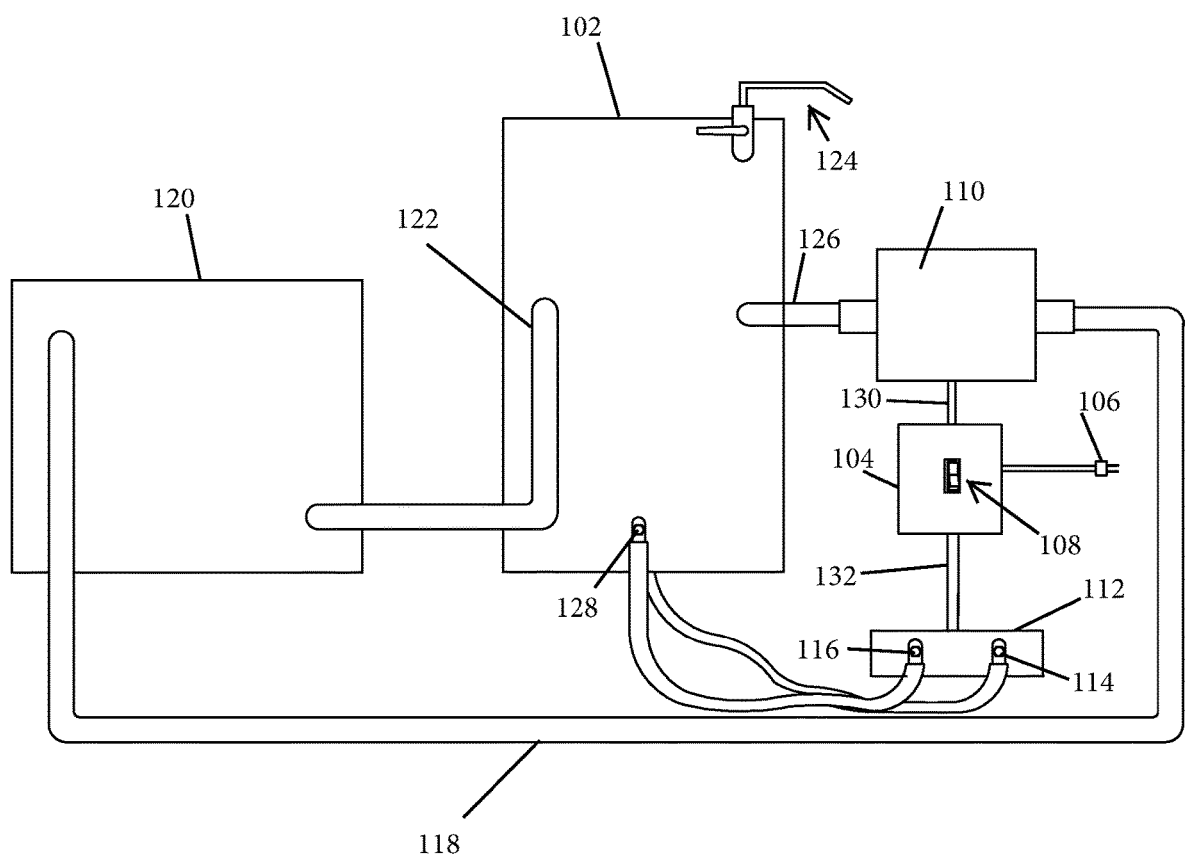
FIG. 1 is a diagram of a system view of an example electrolysis filtering system for dielectric fluids in accordance with some implementations.

FIG. 1 is a diagram of a system view of an example electrolysis filtering system for dielectric fluids in accordance with some implementations. The electrolysis filtering system 100 includes an electrolysis filter 102, a control panel 104, a pump 110, a high voltage power supply 112, and a fluid supply tank 120.

The electrolysis filter 102 having a supply inlet line 122, a relief value 124, an output line 126, and a second terminal 128.

The control panel 104 having a power input 106, a power switch 108, a first power output 130 and a second power output 132.

The pump 110 having a fluid input coupled to an output line 126 of the electrolysis filter 102 and a fluid output coupled to a fluid return line 118. The pump 110 also includes a power input connected to the first power output 130 of the control panel 104.

The high voltage power supply 112 having a power input connected to the second power output 132 of the control panel 104, a first electrode 114 and a second electrode 116, wherein the first electrode 114 of the high voltage power supply 112 is connected to the first electrode plate 802 (not shown in FIG. 1 see FIG. 8) via a first terminal 302 (not shown in FIG. 1, see FIG. 3) of the electrolysis filter 102, and wherein the second electrode of the high voltage power supply 116 is connected to the second electrode plate 902 (not shown in FIG. 1 see FIG. 9) via a second terminal 128 of the electrolysis filter 102.

Figure 2:
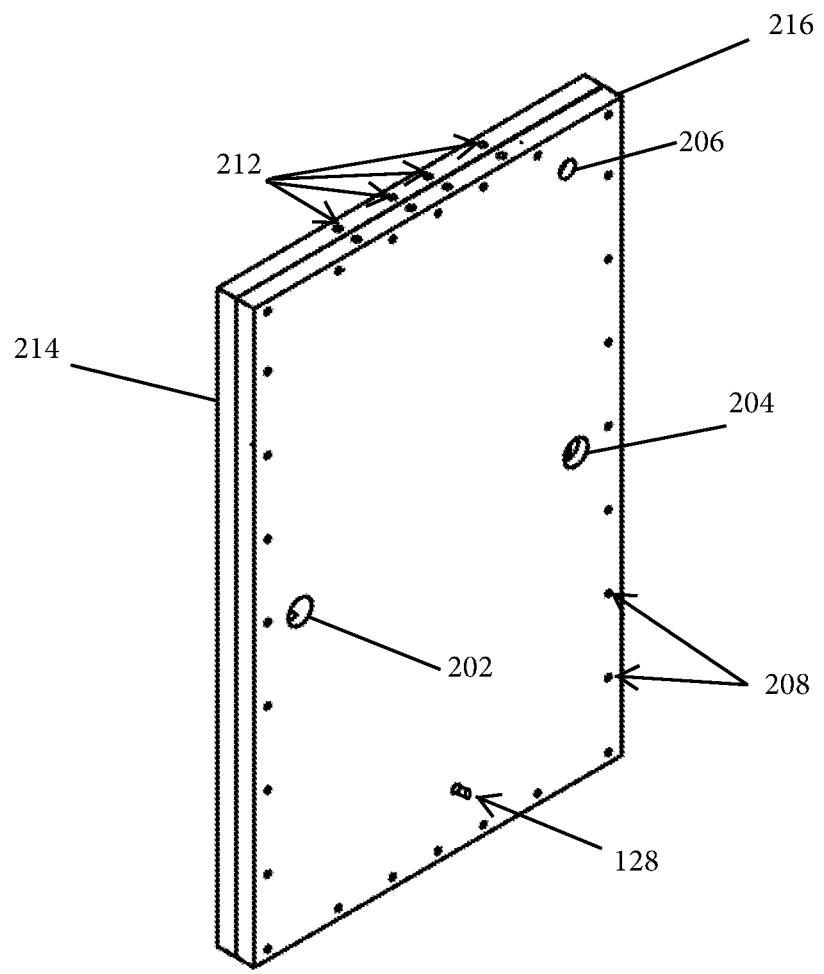
FIG. 2 is a diagram of a back perspective view of an example electrolysis filter for dielectric fluids in accordance with some implementations.

FIG. 2 is a diagram of a back perspective view of an example electrolysis filter 102 for dielectric fluids in accordance with some implementations. The electrolysis filter 102 having a front cover 214, a back cover 216, a first large aperture 202, a second large aperture 204, a small aperture 206, a second terminal 128, a plurality of fasteners 208 connecting the front and back covers together, a plurality of mounting holes 212.

Figure 3:
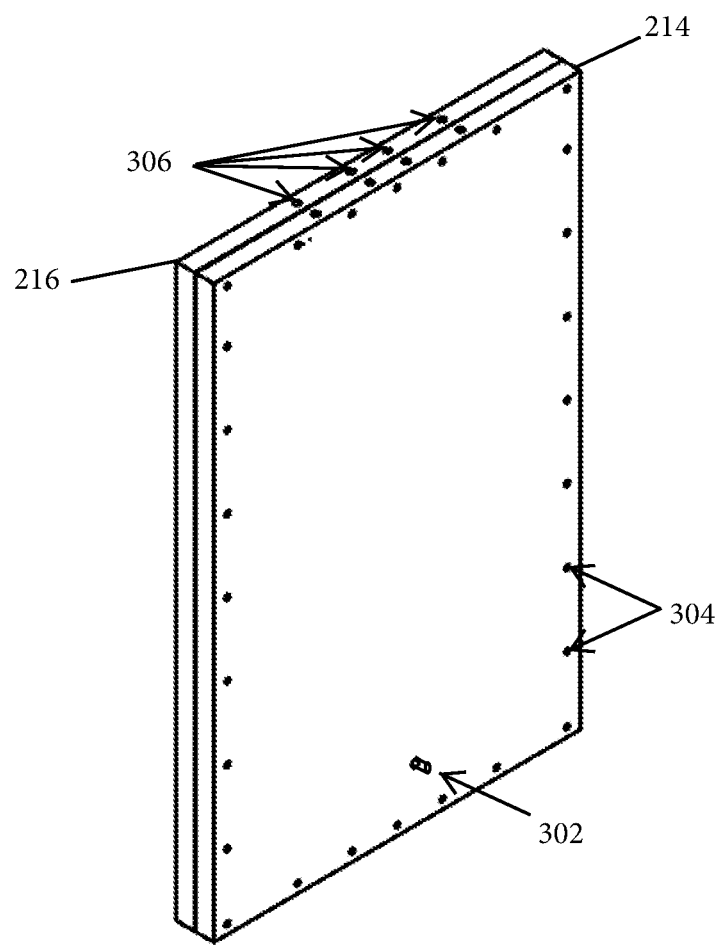
FIG. 3 is a diagram of a front perspective view of an example electrolysis filter for dielectric fluids in accordance with some implementations.

FIG. 3 is a diagram of a front perspective view of an example electrolysis filter 102 for dielectric fluids in accordance with some implementations. The electrolysis filter 102 having a front cover 214, a back cover 216, a first terminal 302, a plurality of fasteners 304 connecting the front and back covers together, a plurality of mounting holes 306.

Figure 4:
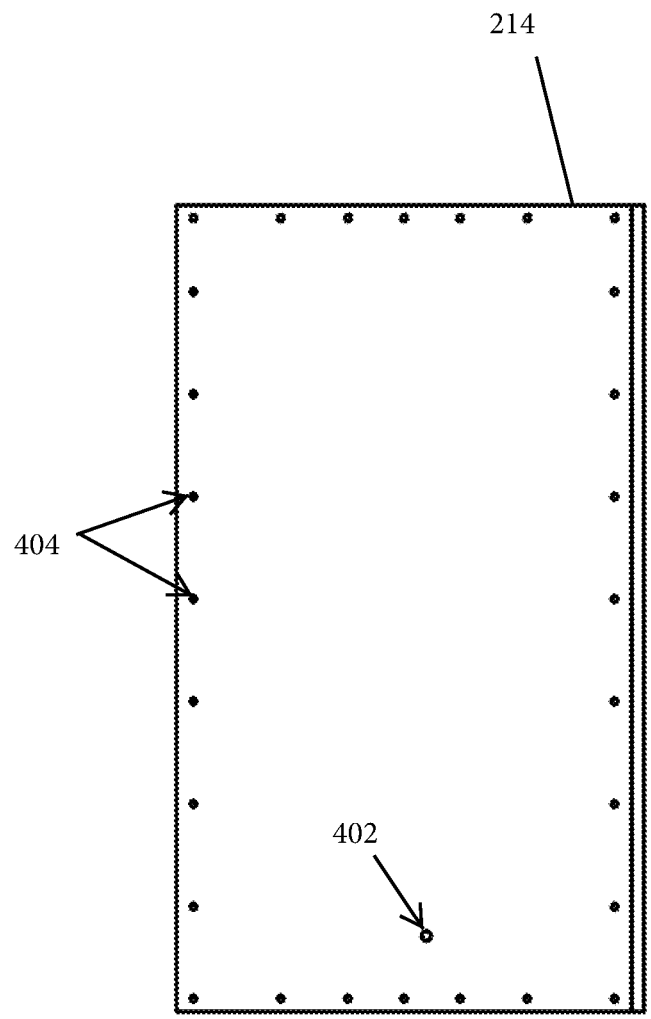
FIG. 4 is a diagram of a front cover outside view of an example electrolysis filter for dielectric fluids in accordance with some implementations.

FIG. 4 is a diagram of a front cover outside view of an example electrolysis filter for dielectric fluids in accordance with some implementations. The electrolysis filter portion 214 having a plurality of holes 404, and a first terminal passage 402.

Figure 5:
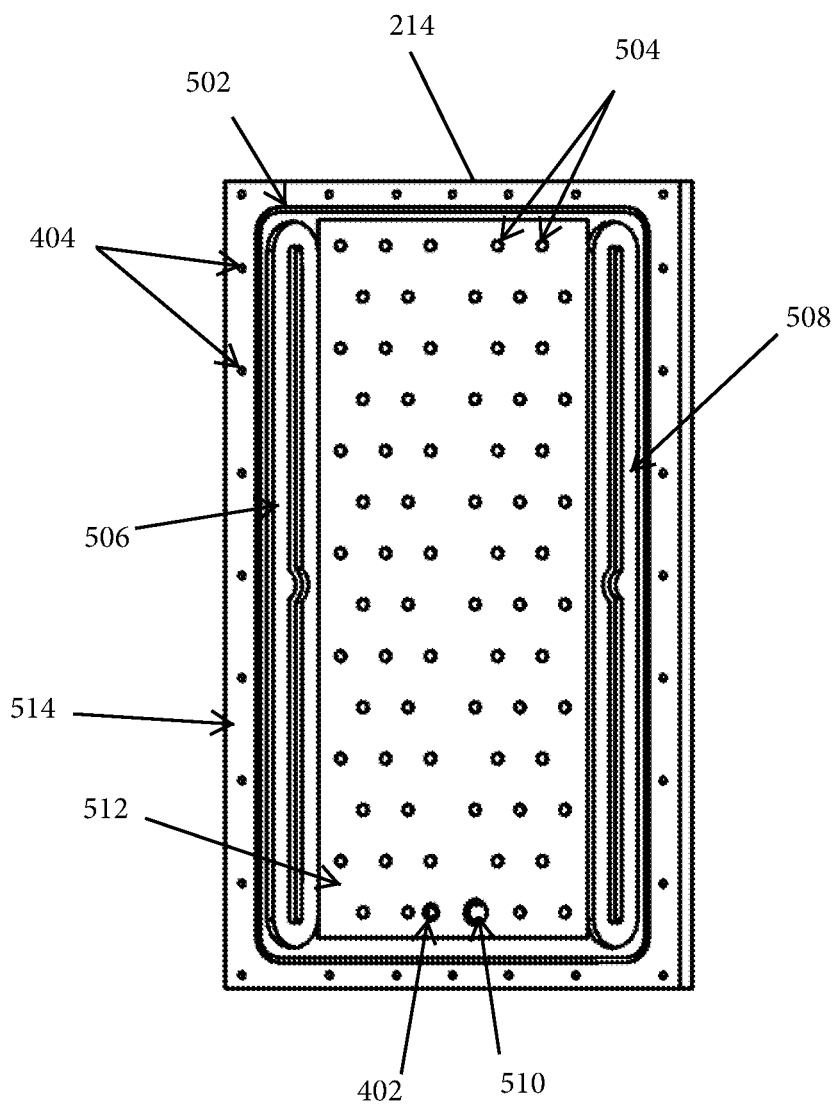
FIG. 5 is a diagram of a front cover inside view of an example electrolysis filter for dielectric fluids in accordance with some implementations.

FIG. 5 is a diagram of a front cover inside view of an example electrolysis filter for dielectric fluids in accordance with some implementations. The electrolysis filter portion 214 having a plurality of holes 404, a small aperture 402, a first counter bore 510, a first plane 514, a second plane 512, a first set of standoffs 504, a first small recessed channel 502, a first large recessed channel 506, and a second large recessed channel 508.

Figure 6:
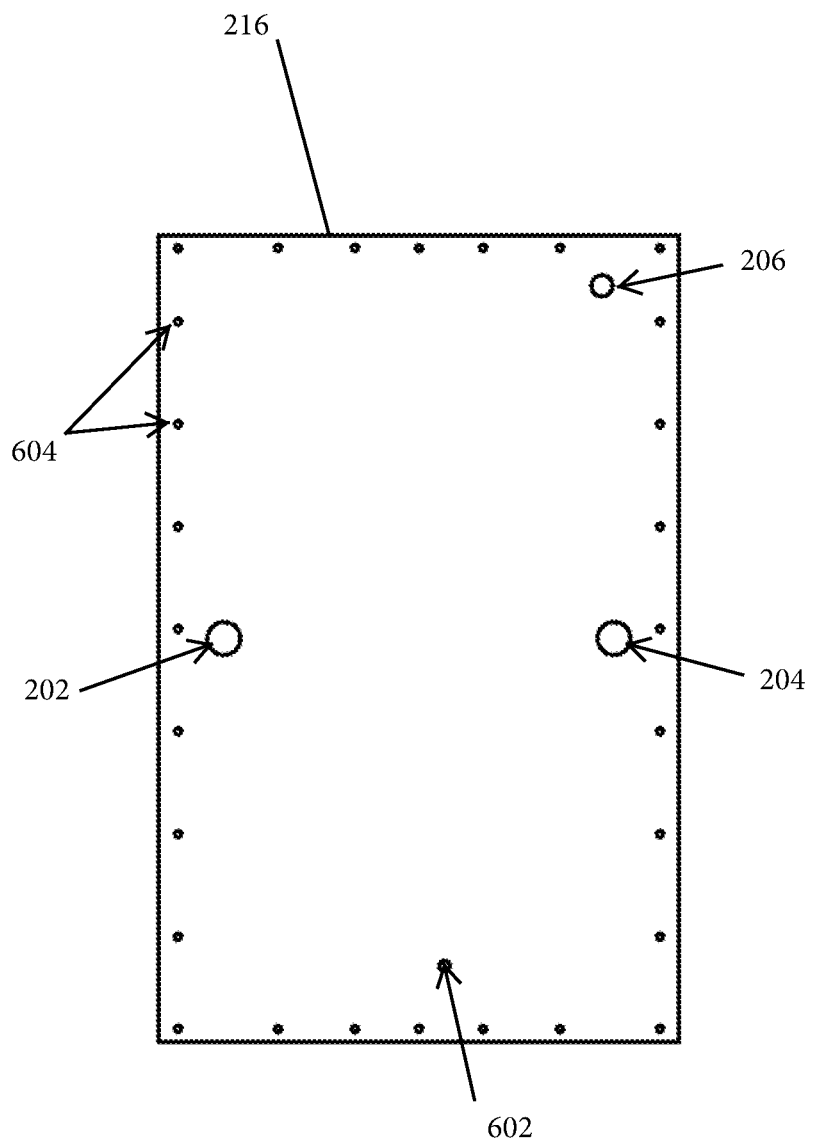
FIG. 6 is a diagram of a back cover outside view of an example electrolysis filter for dielectric fluids in accordance with some implementations.

FIG. 6 is a diagram of a back cover outside view of an example electrolysis filter for dielectric fluids in accordance with some implementations. The electrolysis filter portion 214 having a plurality of holes 604, a first large aperture 202, a second large aperture 204, a small aperture 206, a second terminal passage 602.

Figure 7:
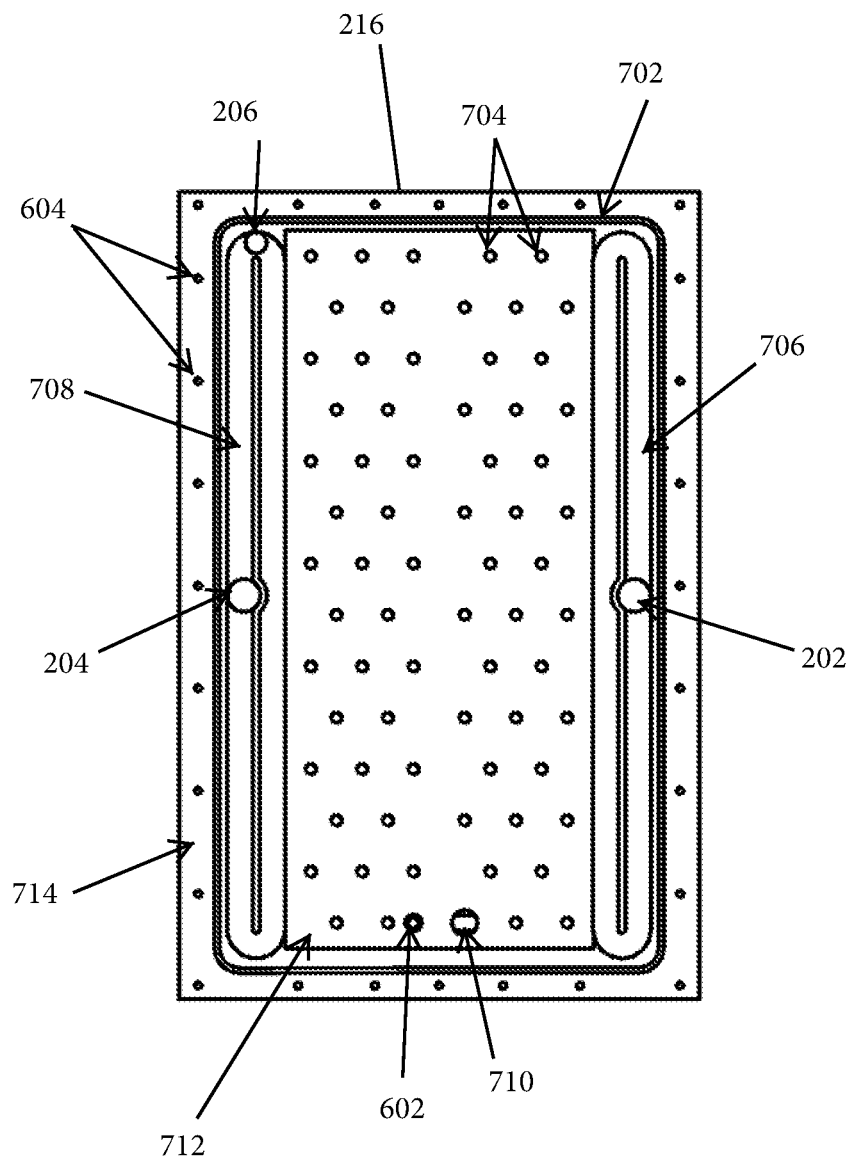
FIG. 7 is a diagram of a back cover inside view of an example electrolysis filter for dielectric fluids in accordance with some implementations.

FIG. 7 is a diagram of a back cover inside view of an example electrolysis filter for dielectric fluids in accordance with some implementations. The electrolysis filter portion 216 having a plurality of holes 604, a second terminal passage 602, a second counter bore 710, a first plane 714, a second plane 712, a second set of standoffs 704, a first small recessed channel 702, a third large recessed channel 706, a fourth large recessed channel 708, a first large aperture 202, a second large aperture 204, a small aperture 206, a second terminal passage 602.

Figure 8:
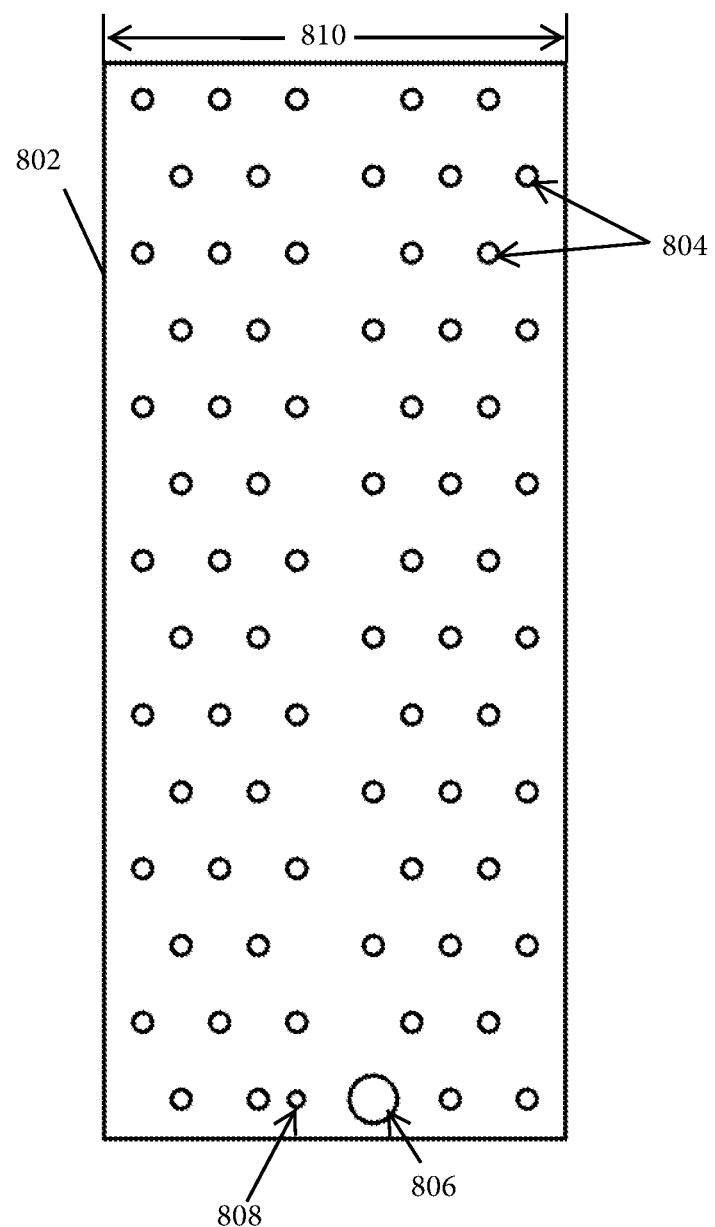
FIG. 8 is a diagram showing a side view of a first electrode plate of an example electrolysis filter for dielectric fluids in accordance with some implementations.

FIG. 8 is a diagram showing a side view of a first electrode plate of an example electrolysis filter for dielectric fluids in accordance with some implementations. The first electrode plate 802 having a plurality of small apertures 804, a first terminal connector passage 808, a first terminal clearance 806, and a first plate width 810.

Figure 9:
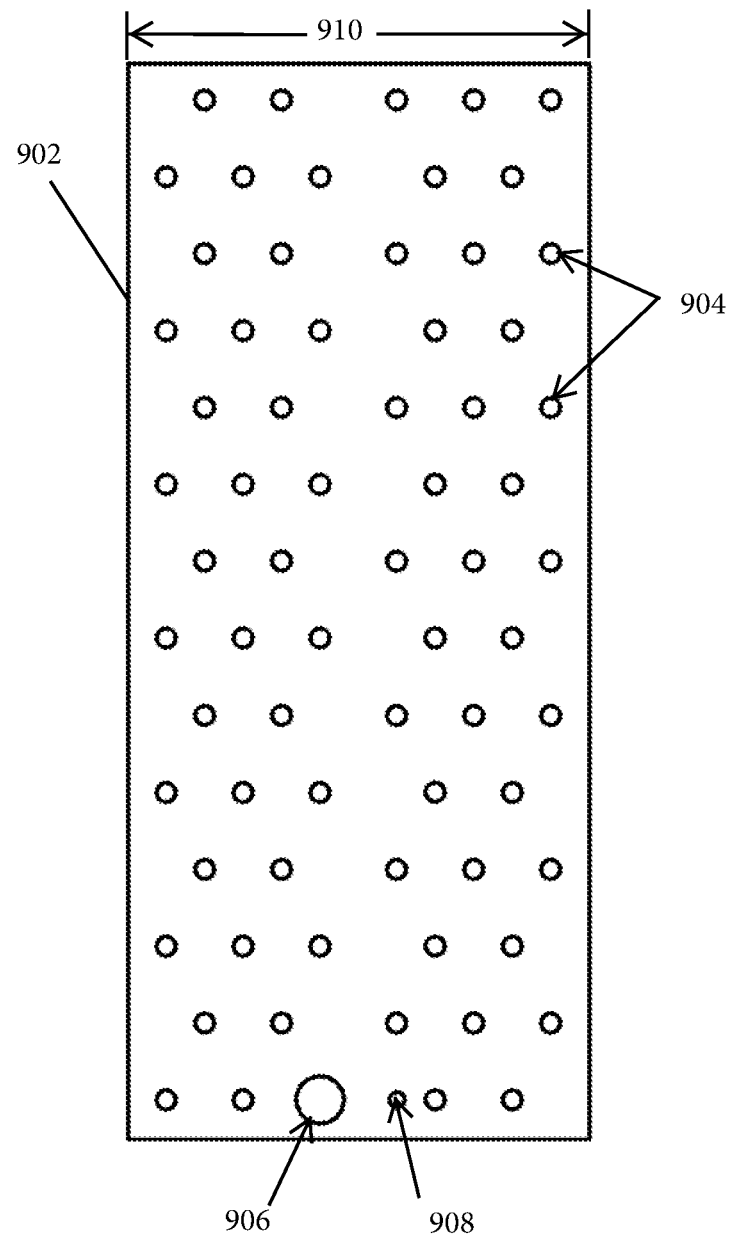
FIG. 9 is a diagram showing a side view of a second electrode plate of an example electrolysis filter for dielectric fluids in accordance with some implementations.

FIG. 9 is a diagram showing a side view of a second electrode plate of an example electrolysis filter for dielectric fluids in accordance with some implementations. The second electrode plate 902 having a plurality of small apertures 904, a second terminal connector passage 908, a second terminal clearance 906, and a second plate width 910.

Figure 10:
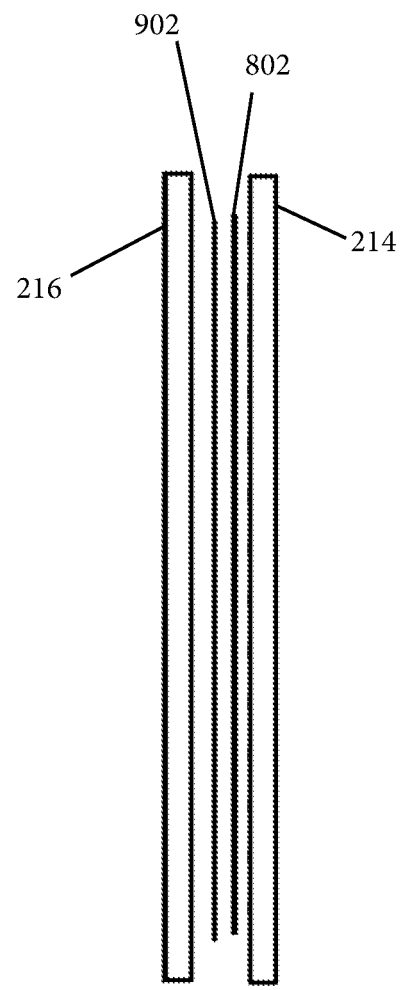
FIG. 10 is a diagram showing an exploded view of an example electrolysis filter for dielectric fluids in accordance with some implementations.

FIG. 10 is a diagram showing an exploded view of an example electrolysis filter for dielectric fluids in accordance with some implementations. The exploded view includes a front cover 214, a back cover 216, a first electrode plate 802, and a second electrode plate 902.

Figure 11:
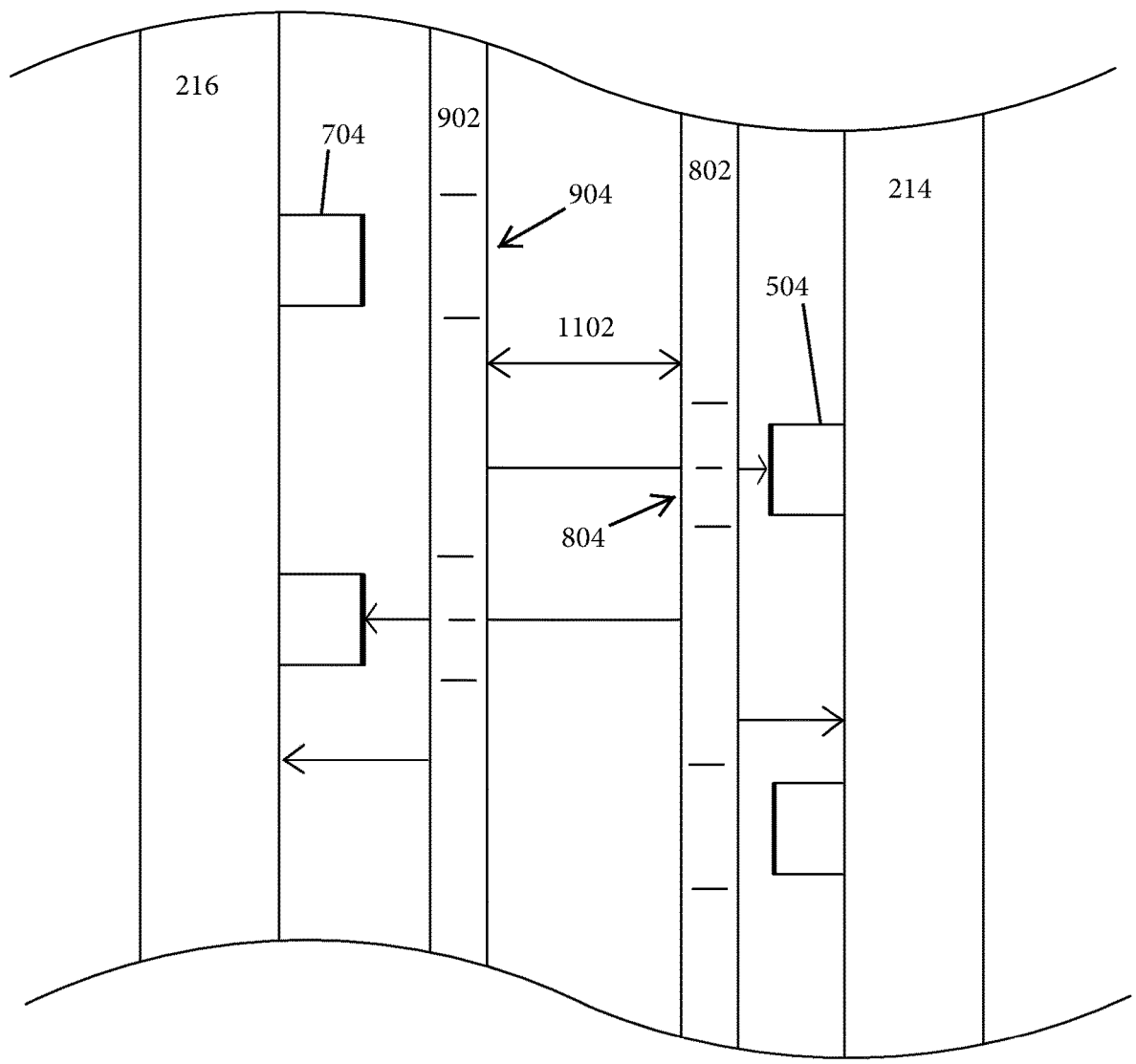
FIG. 11 is a diagram showing an exploded view of an example electrolysis filter for dielectric fluids in accordance with some implementations.

FIG. 11 is a diagram showing an exploded view of an example electrolysis filter for dielectric fluids in accordance with some implementations. The exploded view includes a front cover 214 with a first set of standoffs 504, a back cover 216 with a second set of standoffs 704, a first electrode plate 802 having a plurality of small apertures 804, a second electrode plate 902 having a plurality of small apertures 904, and an electrode plate field spacing 1102.

Figure 12:
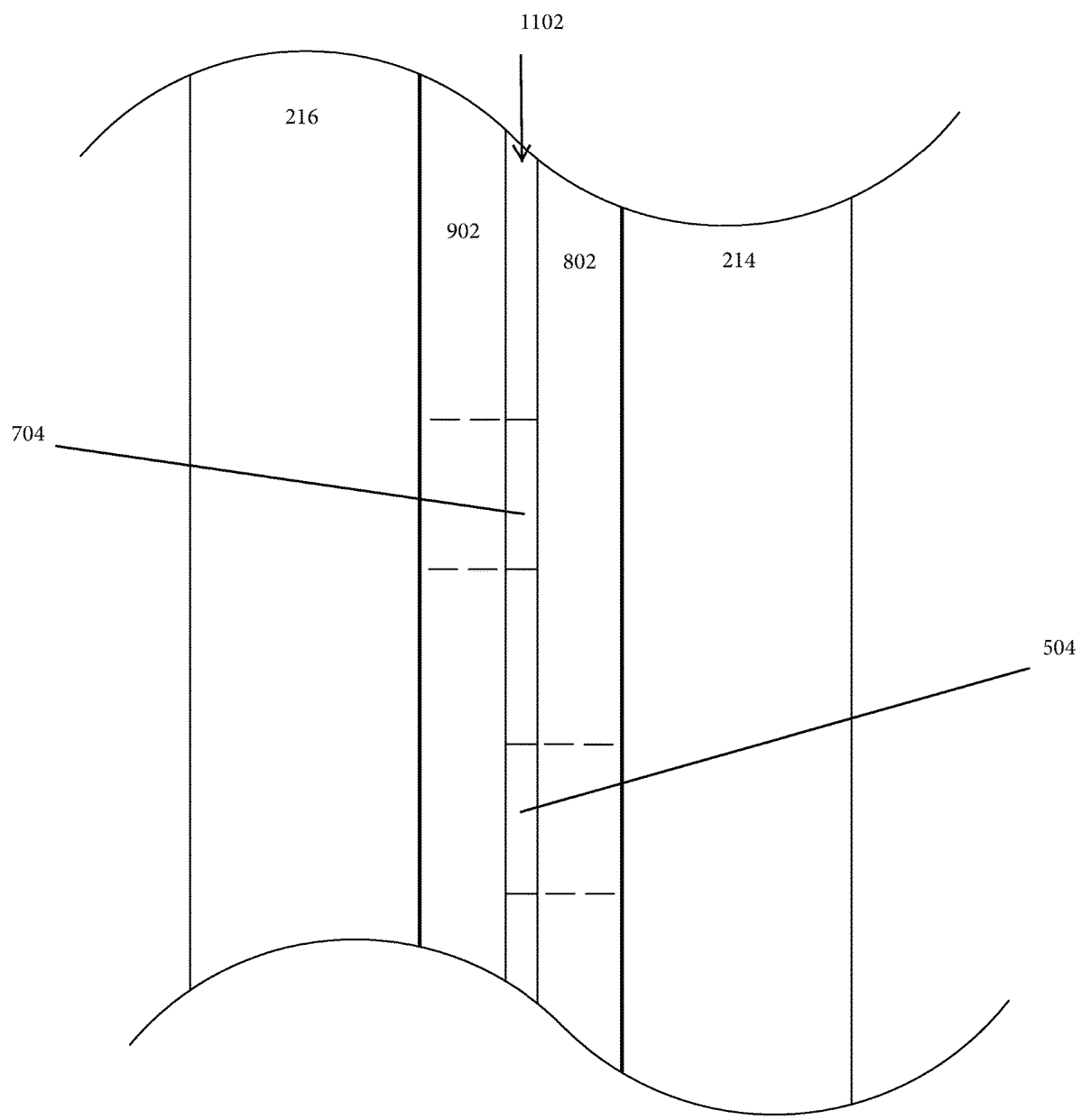
FIG. 12 is a diagram showing a top cut through of an assembled view of an example electrolysis filter for dielectric fluids in accordance with some implementations.

FIG. 12 is a diagram showing a top cut through of an assembled view of an example electrolysis filter for dielectric fluids in accordance with some implementations. The assembled view shows a front cover 214 with a first set of standoffs 504 that protrude through the plurality of small apertures in the first electrode plate 802 and make contact with the second side of the second electrode plate 902, a back cover 216 with a second set of standoffs 704 that protrude through the plurality of small apertures in the second electrode plate 902 and make contact with the second side of the first electrode plate 802. The first and second set of standoffs can be spaced apart on the planar surfaces of the first electrode plate 802 and the second electrode plate 902, provide support for the first electrode plate 802 and the second electrode plate 902, and create a fixed gap between the first electrode plate 802 and the second electrode plate 902. This gap is the electrode plate field spacing 1102. In some implementations, the plates (e.g., the first electrode plate 802 and the second electrode plate 902) can be thick enough (e.g., around 0.048 inch thick or other suitable thickness) to remain rigid (or mostly rigid) in order to provide a uniform spacing between the plates when separated by the standoffs.

In some implementations, the electrolysis filter can have a plurality of electrode plate field spacings. One electrode plate field spacing exists with two electrode plates but each additional plate added will create an additional electrode plate field spacing.

Figure 13:
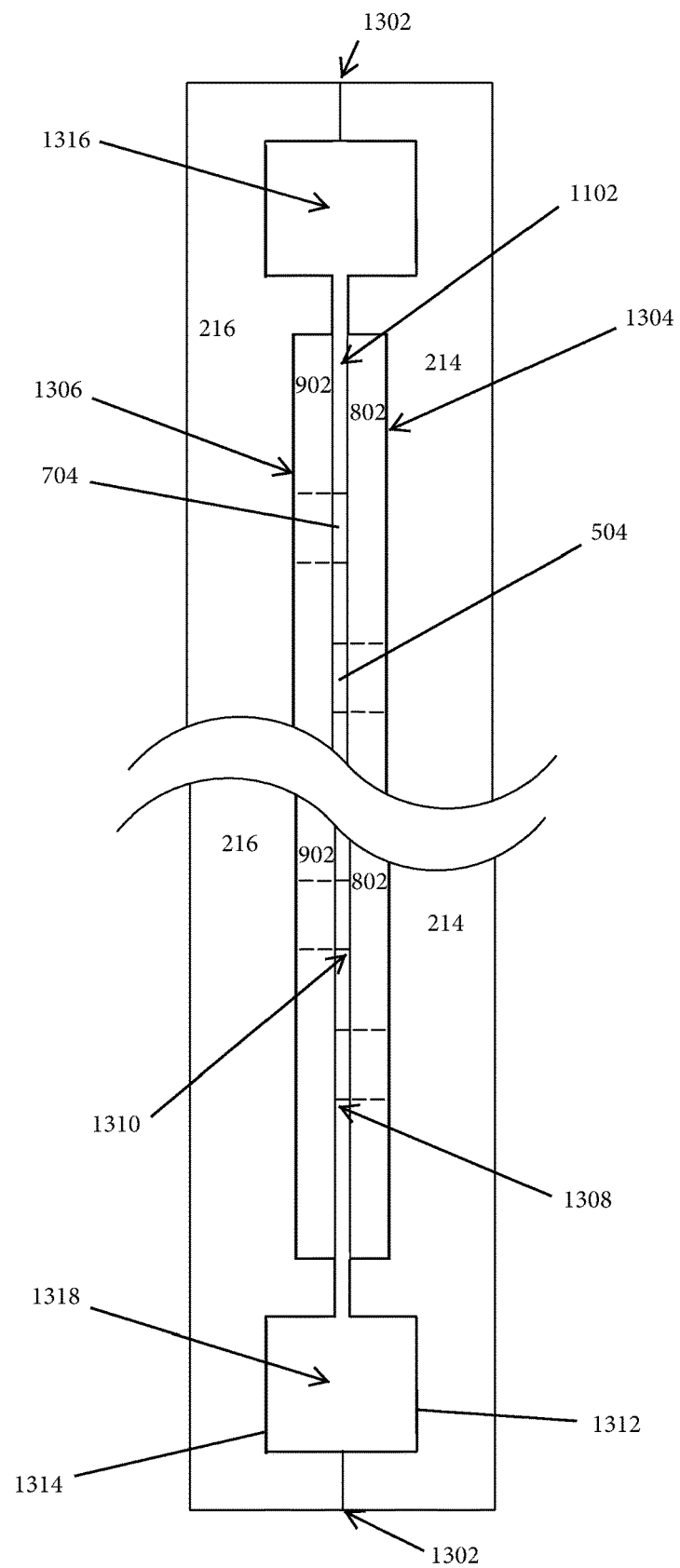
FIG. 13 is a diagram showing a top cut through of an assembled view of an example electrolysis filter for dielectric fluids in accordance with some implementations.

FIG. 13 is a diagram showing a top cut through of an assembled view of an example electrolysis filter for dielectric fluids in accordance with some implementations. The assembled view show the front cover 214 with the first set of standoffs 504, the back cover 216 with the second set of standoffs 704, the first electrode plate 802, the second electrode plate 902, a first plane 1302, a front cover second plane 1304, a back cover second plane 1306, a front cover third plane 1308, a back cover third plane 1310, a front cover fourth plane 1312, a back cover fourth plane 1314, a first void 1316, a second void 1318, and the electrode plate field spacing 1102.

The first large apertures 202 provide a passage for the dielectric fluid to enter the electrolysis filter 102 from the back cover 216 into the first void 1316 between the front cover and the back cover. The dielectric fluid then travels across the first electrode plate 802 and the second electrode plate 902 simultaneously through the electrode plate field spacing 1102. The dielectric fluid then enters into the second void 1318 and exits the electrolysis filter 102 via the second large apertures 204 on the back cover 216. The small aperture 206 also provides a passage from the second void 1318 to the outside of the back cover and is connected to the relief value 124.

In some implementations the relief valve 124 can initially be used for burping any air out of the system and can continue venting to release oxygen and hydrogen gas during the electrolysis process. In some implementations the pressure could be released manually by opening the relief valve 124 or with a mechanical pressure relief valve in line before the relief valve 124.

In some implementations the first void 1316 and the second void 1318 can include a filter medium.

Figure 14:
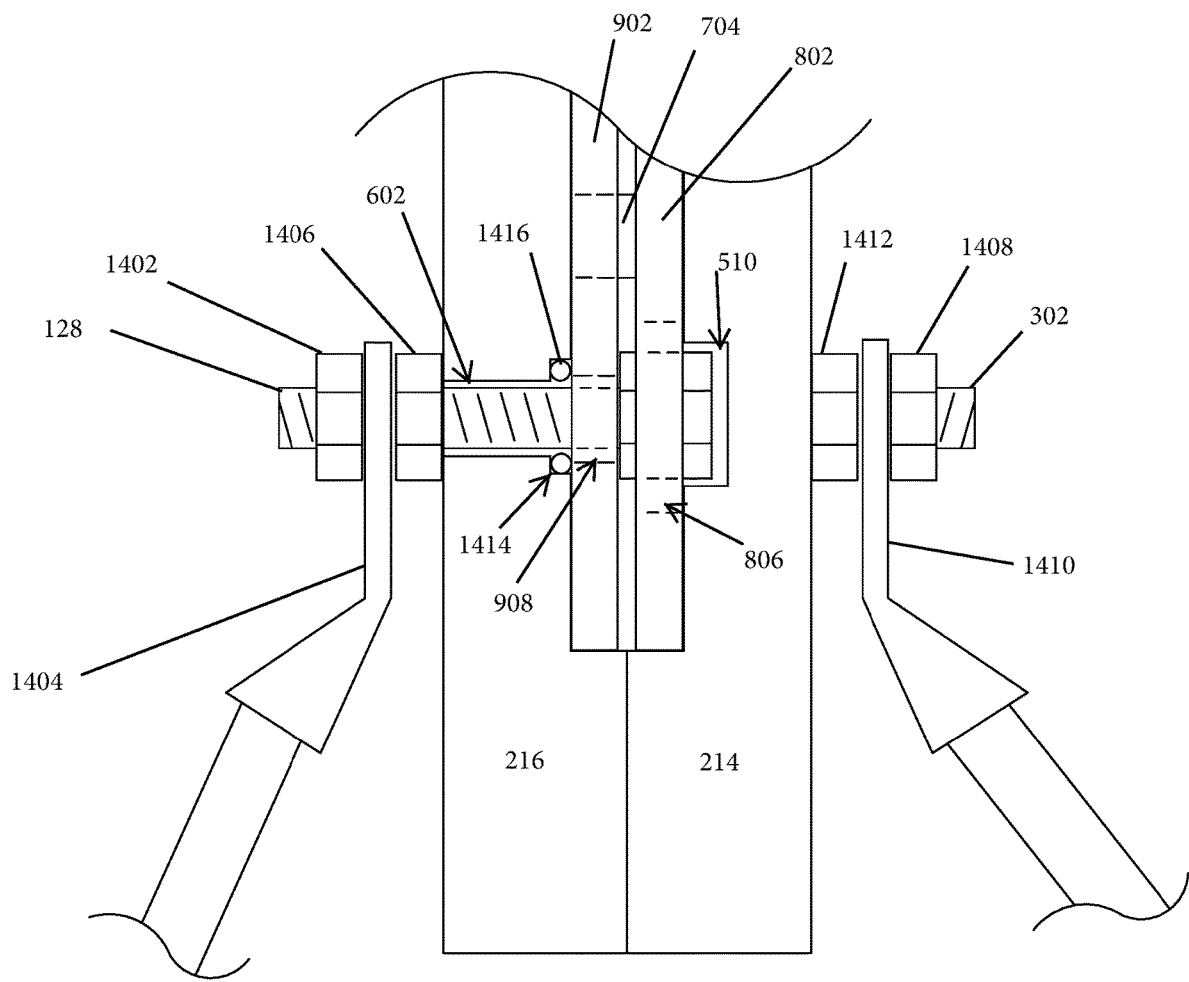
FIG. 14 is a diagram showing a side cut through of an assembled view of an example electrolysis filter for dielectric fluids in accordance with some implementations.

FIG. 14 is a diagram showing a side cut through of an assembled view of an example electrolysis filter for dielectric fluids in accordance with some implementations. The view shows the front cover 214, the back cover 216 with the second set of standoffs 704, the first electrode plate 802, the second electrode plate 902, the first terminal 302, a first terminal nut 1408, a second terminal nut 1412, a first terminal cable, a third terminal nut 1402, a fourth terminal nut 1406, a second terminal cable 1404, the second terminal 128, the second terminal passage 602, the first counter bore 510, an o ring grove 1414, an o ring 1416, the second terminal connector passage 908, and the first terminal clearance 806.

In some implementations the first terminal passage 402 and the second terminal passage 602 could be a drilled aperture. In some implementations the passage could be tapped.

Figure 15:
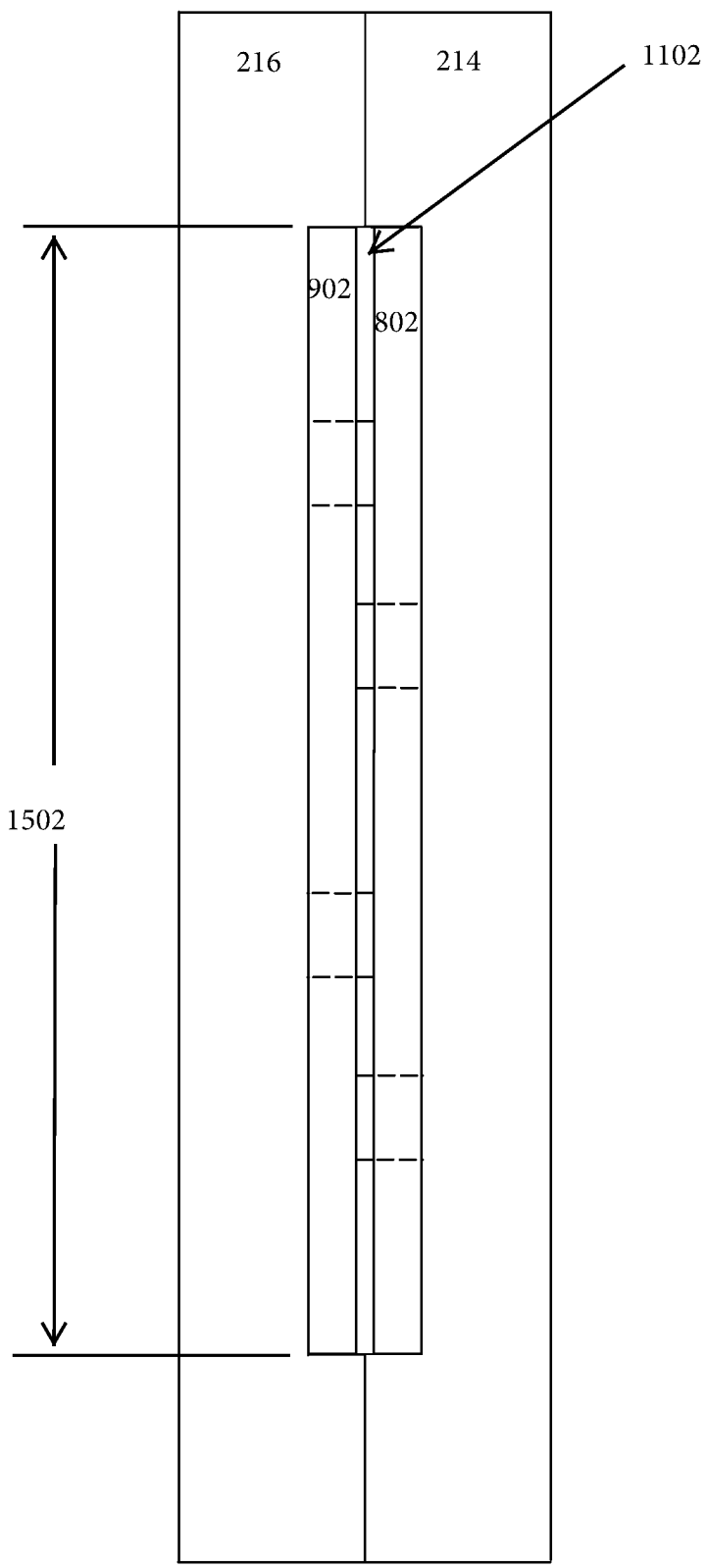
FIG. 15 is a diagram showing a side cut through of an assembled view of an example electrolysis filter for dielectric fluids in accordance with some implementations.

FIG. 15 is a diagram showing a side cut through of an assembled view of an example electrolysis filter for dielectric fluids in accordance with some implementations. The view shows the front cover 214, the back cover 216, the first electrode plate 802, the second electrode plate 902, the electrode plate field spacing 1102, and an electrode plate field parallel length 1502.

The electrode plate field parallel length 1502 is perpendicular to the electrode plate field spacing 1102. The electrode plate field spacing 1102 may need to be a narrow path in order for an electrolysis reaction to occur to the dissolved water in the dielectric fluid as it passes through the electrode plate field spacing. To prevent this narrow path from causing a pressure build up the electrode plate field parallel length should be more than or equal to the diameter area in square inches to that of the first large aperture 202 and the second large apertures 204 (e.g., a 1 inch line having an area in square inches of 0.785 inches, an electrode plate field spacing of 0.029 inches would need a parallel length of 27.06 inches of simultaneous travel for the dielectric fluid to flow through the electrode plate field spacing to avoid building up pressure).

The first electrode plate width 810 and the second electrode plate width 910, determines the distance of travel through the electrode plate field spacing. This distance determines the amount of filtering preformed in each pass. The overall dimension of the electrode plates and the gap of the electrode plate field spacing are relative to the voltage (e.g., an electrode plate field spacing of 0.029 inches with a electrode plate width of 12 inch would allow about 800 vdc across the electrode plates. If the electrode plate field spacing is decreased the voltage may need to be decreased or if you increase the electrode plate width the voltage may need to be decreased to prevent arcing).

With a DC voltage of about 800 volts across the electrode plates 802/902 and an electrode plate field spacing 1102 of about 0.029 inches the decomposition potential is reached. This will start the electrolysis process on the dissolved water in the dielectric fluid and begins to decrease the dissolved water down to a low ppm. The current will increase with the increase of dissolved water in the dielectric fluid and decrease with the removal of the dissolved water. The above voltage and the electrode plate field spacing is one example of a working setting. In another example, the decomposition potential can be reached in a voltage range from around 200 volts to around 1700 volts and an electrode plate field spacing ranging from around a few thousands of an inch to around thirty five thousands of an inch.

The electrode plate width and electrolysis filter dimension respectively can be increased to provide a longer path of travel for the dielectric fluid or multiple electrolysis filters could be daisy chained together in series to provide more filtering each cycle of travel through the electrolysis filter.

While the disclosed example electrolysis filter for dielectric fluids is depicted in a rectangular shape, the electrolysis filter or housing could be other shapes (e.g., round, oval, triangular, etc.).

While the disclosed example electrolysis filter for dielectric fluids is described with a control panel 104 only having a simple on/off power switch but it a can include a plurality of sensors and switches (e.g., including, but not be limited to, pressure sensors, temperature sensors, water sensors, relay valves) that can be controlled by a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C #.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like. The computer can connect to a network such as, but not limited to Bluetooth, Wi-Fi and be controlled or monitored over the web via a computer or mobile app.

It is, therefore, apparent that there is provided, in accordance with the various embodiments disclosed herein, electrolysis filtering system for dielectric fluids.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. An electrolysis filter for dielectric fluids, the electrolysis filter comprising:
   a housing that contains a first aperture as a fluid input, a second aperture as a fluid output, and a third aperture as a relief vent;
   a first electrode plate;
   a second electrode plate, wherein the first electrode plate and the second electrode plate each have an electrode plate field parallel length, and wherein a distance between the first electrode plate and the second electrode plate, when installed in the housing, define an electrode plate field spacing;
   a first terminal;
   a second terminal; and
   a power supply, wherein the first terminal and the second terminal connect to the power supply,
   wherein a voltage output level of the power supply is based on the electrode plate field spacing, and
   wherein the electrode plate field parallel length multiplied by the electrode plate field spacing is about equal to an area of the first aperture or the large aperture.

2. The electrolysis filter of claim 1, further comprising a plurality of electrode plate field spacings, wherein a total area of the plurality of electrode plate field spacings multiplied by the parallel length is about equal to an area of the first large aperture.

3. The electrolysis filter of claim 1, wherein the housing is formed of a non-conductive material.

4. The electrolysis filter of claim 1, wherein the first electrode plate and the second electrode plate are formed of an electrically conductive, non-corrosive material.

5. An electrolysis filter for dielectric fluids, the electrolysis filter comprising:
   a housing that contains a first aperture as a fluid input, a second aperture as a fluid output, and a third aperture as a relief vent;
   a first electrode plate; and
   a second electrode plate, wherein the first electrode plate and the second electrode plate each have an electrode plate field parallel length, and wherein a distance between the first electrode plate and the second electrode plate, when installed in the housing, define an electrode plate field spacing,
   wherein the electrode plate field spacing multiplied by the parallel length is about equal to an area of the first large aperture or the second large aperture.

6. The electrolysis filter of claim 5, further comprising a first terminal coupled to the first electrode plate; and a second terminal coupled to the second electrode plate.

7. The electrolysis filter of claim 5, wherein the electrode plate field spacing is within a range of three thousandths of an inch to thirty five thousandths of an inch.

8. The electrolysis filter of claim 5, further comprising a plurality of electrode plate field spacings, wherein a total area of the plurality of electrode plate field spacings multiplied by the parallel length is about equal to an area of the first large aperture.

9. The electrolysis filter of claim 5, wherein the housing is formed of a non-conductive material.

10. The electrolysis filter of claim 5, wherein the first electrode plate and the second electrode plate are formed of an electrically conductive, non-corrosive material.

11. The electrolysis filter of claim 5, wherein the housing is formed of a conductive material, wherein the housing is isolated from the first electrode plate and the second electrode plate.

12. The electrolysis filter of claim 11, further comprising a first terminal coupled to the first electrode plate; and a second terminal coupled to the second electrode plate, wherein the first and second terminals are isolated from the housing.

13. The electrolysis filter of claim 5, wherein the first electrode plate and the second electrode plate are placed within an area of the housing not in the direct path of the fluid input and fluid output.

14. The electrolysis filter of claim 5, wherein a plurality of first electrode plates and a plurality of second electrode plates is placed within an area of the housing not in the direct path of the fluid input and fluid output.

15. The electrolysis filter of claim 1, wherein the power supply is configured to apply a voltage in a range between 200 to 1700 volts.

16. The electrolysis filter of claim 6, further comprising a power supply, wherein the power supply is connected to the first terminal and the second terminal.

17. The electrolysis filter of claim 16, wherein the power supply is configured to apply a voltage in a range between 200 to 1700 volts.

* * * * *